US007245817B1

(12) United States Patent
Nichols et al.

(10) Patent No.: US 7,245,817 B1
(45) Date of Patent: Jul. 17, 2007

(54) MULTIMEDIA TRANSFER SYSTEM

(75) Inventors: James B. Nichols, Los Altos, CA (US); Stephen G. Perlman, Palo Alto, CA (US)

(73) Assignee: Digeo, Inc., Kirkland, WA (US)

( * ) Notice: Subject to any disclaimer, the term of this patent is extended or adjusted under 35 U.S.C. 154(b) by 1309 days.

(21) Appl. No.: 09/717,458

(22) Filed: Nov. 20, 2000

(51) Int. Cl.
*H04N 5/91* (2006.01)

(52) U.S. Cl. .................. 386/46; 386/109; 386/125; 369/178.1; 711/114; 702/109; 702/182

(58) Field of Classification Search ........ 386/125–126, 386/108–112, 46; 369/30.06, 30.07, 178.1; 725/87, 109; 711/114; 702/109, 182
See application file for complete search history.

(56) References Cited

U.S. PATENT DOCUMENTS

| | | | |
|---|---|---|---|
| 5,631,888 A * | 5/1997 | Itoh et al. ................ | 369/47.12 |
| 5,691,964 A | 11/1997 | Niederlein et al. | |
| 5,751,672 A | 5/1998 | Yankowski | |
| 5,946,605 A * | 8/1999 | Takahisa et al. ............... | 455/68 |
| 6,094,521 A * | 7/2000 | Okayama et al. ............. | 386/44 |
| 6,208,612 B1 * | 3/2001 | Miller ...................... | 369/30.19 |
| 6,563,769 B1 * | 5/2003 | Van Der Meulen ...... | 369/30.06 |
| 6,711,343 B1 * | 3/2004 | Matsumi et al. ............... | 386/46 |
| 2002/0056119 A1 * | 5/2002 | Moynihan ..................... | 725/87 |
| 2003/0031096 A1 * | 2/2003 | Nathan et al. ........... | 369/30.03 |
| 2003/0135550 A1 * | 7/2003 | Koyata et al. ........... | 369/30.07 |
| 2005/0246752 A1 * | 11/2005 | Liwerant et al. ............ | 725/109 |

FOREIGN PATENT DOCUMENTS

| | | |
|---|---|---|
| EP | 0 762 768 A2 | 3/1997 |
| WO | WO 99/64969 | 12/1999 |

* cited by examiner

*Primary Examiner*—Vincent F. Boccio
(74) *Attorney, Agent, or Firm*—Kory D. Christensen; Stoel Rives LLP

(57) ABSTRACT

A multimedia transfer apparatus is described comprising: a plurality of media readers; one or more encoder modules, configured to encode data read by the media readers in a specified encoding format; and a data communication interface configured to copy the encoded data to a media storage and playback apparatus.

Also described is a computer-implemented method for transferring multimedia content comprising: reading first multimedia data from a first CD/DVD; encoding the first multimedia data to produce first encoded data in parallel with reading multimedia data from a second CD/DVD; encoding the second multimedia data to produce second encoded data; and transmitting the first and second encoded data to a multimedia storage and playback apparatus.

13 Claims, 8 Drawing Sheets

MULTIMEDIA TRANSFER SYSTEM

BACKGROUND

1. Field of the Invention

This invention relates generally to the field of digital audio/video storage and playback systems. More particularly, the invention relates to a compact disc system in which digital audio/video content is stored, indexed and played back from a mass storage device such as a hard drive.

2. Description of the Related Art

Various types of high capacity compact disc (hereinafter "CD") and digital video disc ("DVD") players have been developed over the years. These players typically include a rotary carousel or, alternatively, a plug-in cartridge with a plurality of slots for holding CD/DVDs to be played. Some more advanced CD/DVD players/changers are capable of storing several hundred CD/DVDs at one time.

There are several drawbacks associated with these devices, however. First, as the number of CD/DVDs that a CD,/DVD player can accommodate increases, so does the size of the CD/DVD player. Accordingly, CD/DVD players which are capable of storing 100 or more CD/DVDs are typically require large and bulky, requiring a significant amount of shelf space.

In addition, once a user loads all of his CD/DVDs into one of these high-capacity players, his CD/DVDs are no longer easily accessible. In order to remove a particular CD/DVD from his player, a user may need to search through several hundred CD/DVDs to find the one he needs. Accordingly, this type of system may be burdensome to users who need to swap out their CD/DVDs on a regular basis (e.g., users who own a car CD/DVD player). Finally, these "high-capacity" systems present a serious limitation in that the user cannot add CD/DVDs to the unit once the user reaches the storage capacity of the unit. Thus, said systems are impractical for cataloging growing media libraries.

SUMMARY

A multimedia transfer apparatus is described comprising: a plurality of media readers; one or more encoder modules configured to encode data read by the media readers in a specified encoding format; and a data communication interface configured to copy the encoded data to a media storage and playback apparatus.

Also described is a means for combining a plurality of said multimedia transfer apparatus together to form a homogenous processing ensemble of correspondingly higher capacity and throughput.

Also described is a computer-implemented method for transferring multimedia content comprising: reading first multimedia data from a first CD/DVD; encoding the first multimedia data to produce first encoded data in parallel with reading multimedia data from a second CD/DVD; encoding the second multimedia data to produce second encoded data; and transmitting the first and second encoded data to a multimedia storage and playback apparatus.

BRIEF DESCRIPTION OF THE DRAWINGS

A better understanding of the present invention can be obtained from the following detailed description in conjunction with the following drawings, in which:

FIG. 1 illustrates one embodiment of a CD/DVD storage apparatus communicating to a server over a network.

FIG. 2 illustrates another embodiment of a CD/DVD storage apparatus communicating to a server via a wireless transmission medium.

FIG. 3 illustrates one embodiment of a system in which a server communicates specific information to and from a CD/DVD storage apparatus.

FIG. 4 illustrates another embodiment of a system in which a server communicates specific information to and from a CD/DVD storage apparatus.

FIG. 5 illustrates one embodiment of a multimedia transfer apparatus.

FIG. 6 illustrates concurrent read and encoding operations according to one embodiment of the invention.

FIG. 7 illustrates a hardware architecture employed in one embodiment of a multimedia transfer apparatus.

FIG. 8 illustrates a plurality of multimedia transfer apparatus cooperatively interconnected over a network.

DETAILED DESCRIPTION

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the invention.

Embodiments of a Compact Disc and Digital Video Disc Storage and Playback System In FIG. 1 a CD/DVD storage and playback system 100 according to one embodiment of the invention is illustrated. The system 100 includes a storage and playback apparatus 105 which communicates over a network 140 to one or more servers 150.

In one embodiment, the storage and playback apparatus 105 includes a CD/DVD drive 105 for reading digital data stored on a user's CDs/DVDs, a mass storage device 130 (e.g., such as a hard drive), a display 140, and an interface card 120 for communicating to other devices (e.g., server 150) over a network 140.

In operation, a user loads each of his CDs/DVDs in the apparatus 105 via the CD/DVD drive 110 tray. The apparatus 105 includes logic which, in one embodiment, automatically copies all of the CD/DVD audio/video data to the mass storage device 130 in compressed/encoded format. Alternatively, one embodiment allows the user to select only certain tracks from the CD/DVD to be copied to the mass storage device 130. When the user subsequently decides to listen to an audio CD, the audio content is readily available on the mass storage device 130.

Accordingly, the present system solves many of the problems associated with high capacity CD/DVD players. Hundreds (or even thousands) of CDs/DVDs may be stored on mass storage device 130 without a corresponding increase in the size of the storage and playback apparatus 105. For example, if a hard drive is used as mass storage device 130, then all of a user's CD/DVDs may be compressed and stored on a playback apparatus 105 smaller than a notebook computer. In addition, once a user has loaded his CD/DVD collection onto the playback apparatus 105, he is free to use his CDs/DVDs in other places (e.g., in a DiscMan™, a car CD/DVD player, or a portable MP-3 audio player such as the Diamond RIO).

Figure 3:
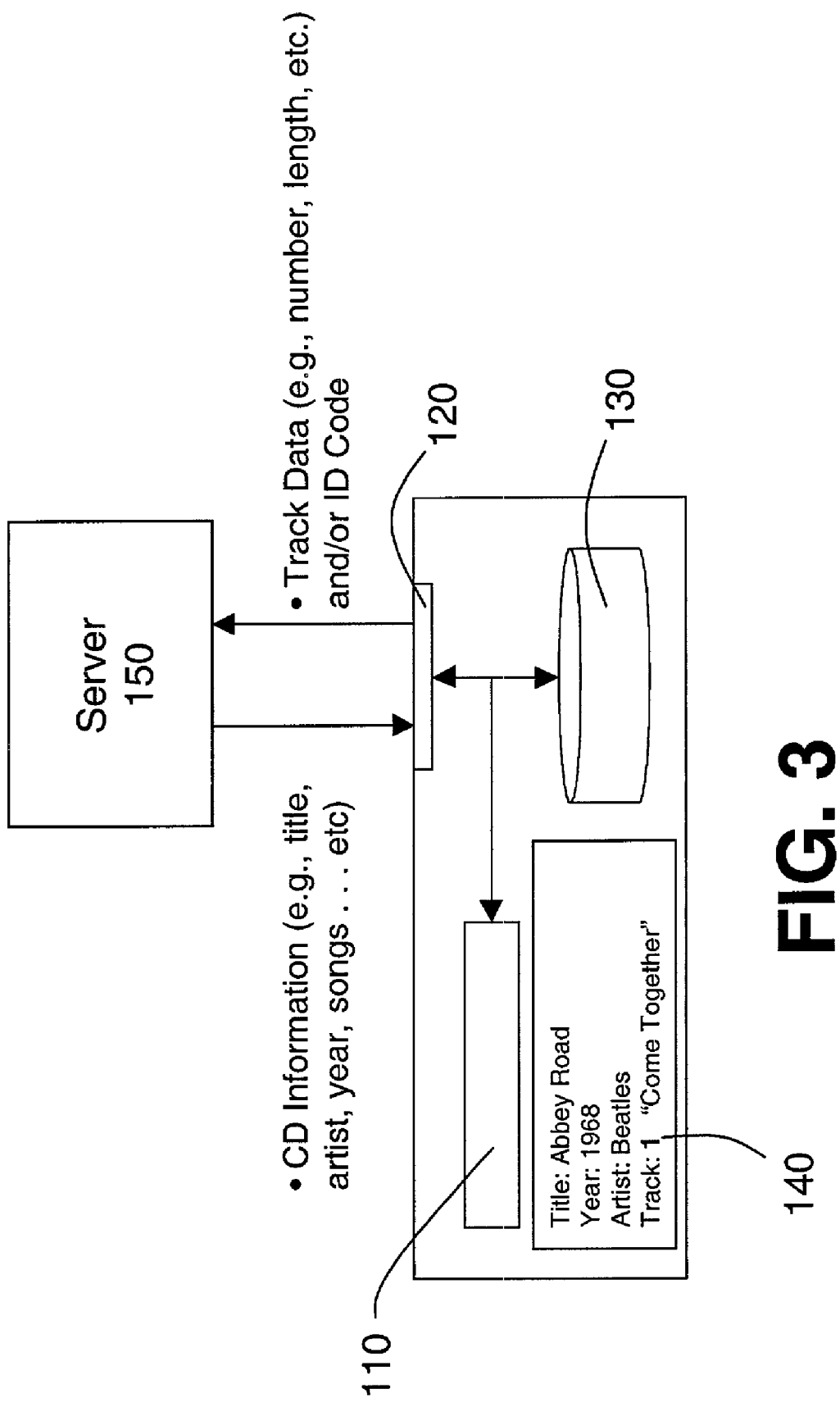

In one embodiment of the system 100, the storage and playback apparatus 105 includes an interface unit 120 which allows the apparatus 105 to communicate with a server 150 over a network 140. In this embodiment, when a user loads a new CD/DVD into the apparatus 105, the apparatus 105 will transmit CD/DVD identification data to server 150 as illustrated in FIG. 3. This identification data may be in the form of an ID number (e.g., the disc's serial number) or, if an ID number is unavailable, the track data for the CD/DVD may be sent to server 150 for identification purposes (i.e., a hashing function computed from the number of tracks combined with the length of each track will uniquely identify a CD/DVD). In one embodiment, a checksum calculated for a known unique portion of the CD/DVD is transmitted to the server 150 to identify the CD/DVD. Various other types of identification data may be transmitted to the server 150 consistent with the underlying principles of the invention.

Regardless of how CDs/DVDs are identified, a CD/DVD database on the server 150 is continually updated to contain the most recent information on released CDs/DVDs. Upon receiving CD/DVD identification data from the storage and playback apparatus 105, the server 150 will identify the CD/DVD and transmit CD/DVD-related information to the apparatus 105. This may include, for example, indexing data such as the title of the CD/DVD and the title of each track on the CD/DVD, the year the CD/DVD was released, the lyrics for each song, and various other types of CD/DVD-related data. One embodiment of the storage and playback apparatus 105 stores this information in a CD/DVD database on the mass storage device 130. If the descriptive information for this disc is not available on the remote server 150, the individual installing the content (e.g., a content installation technician) may upload the disc's stock keeping unit (SKU) and/or descriptive textual content information to server 150 (e.g., using an optical character reader (OCR) wand). Users will then be able to locate specific CDs/DVDs and tracks on the playback apparatus 105 by searching through the CD/DVD database. In one embodiment, information relating to the CD/DVD and/or the track being played/selected is displayed on a display unit 140.

Figure 1:
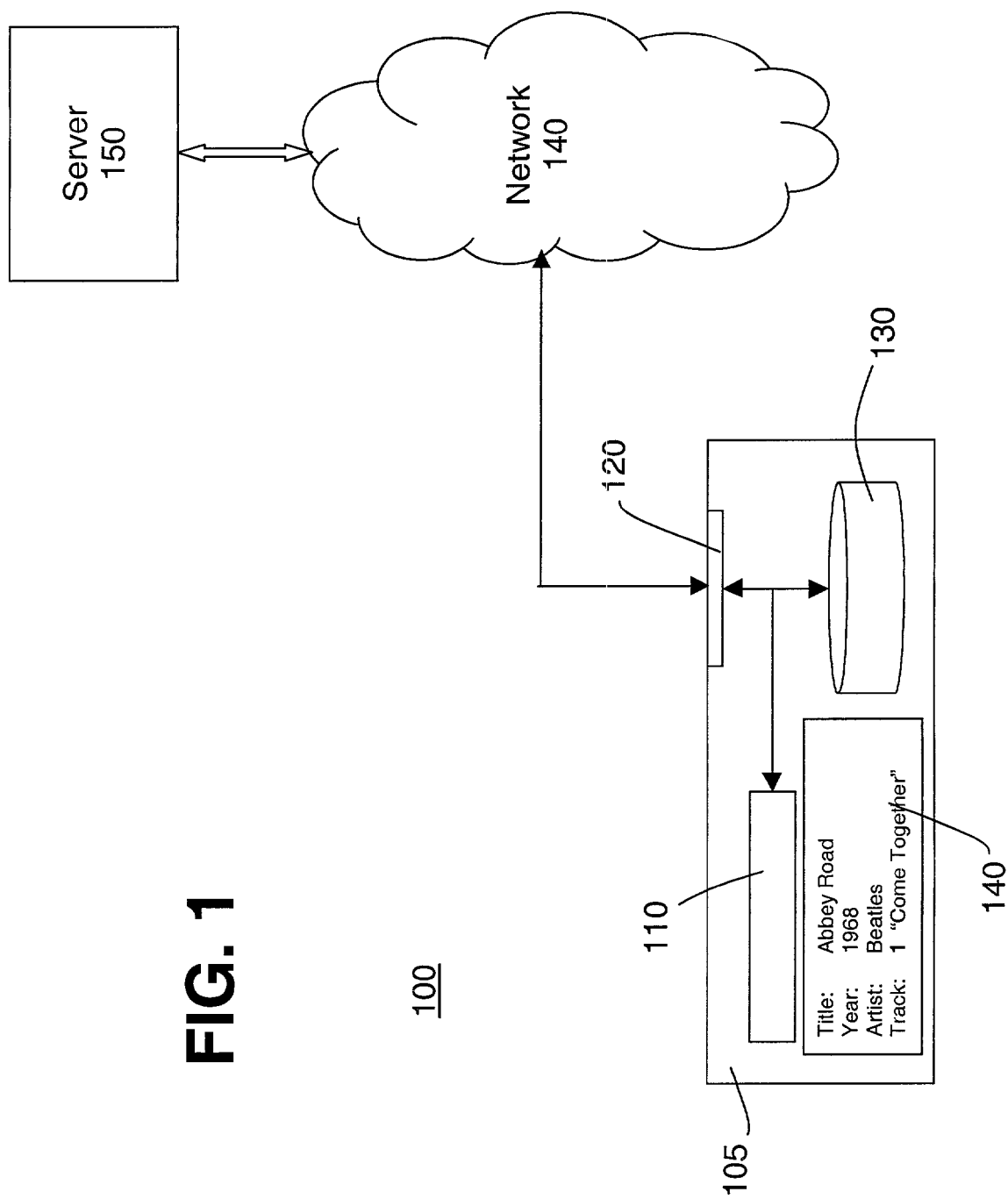
Figure 2:
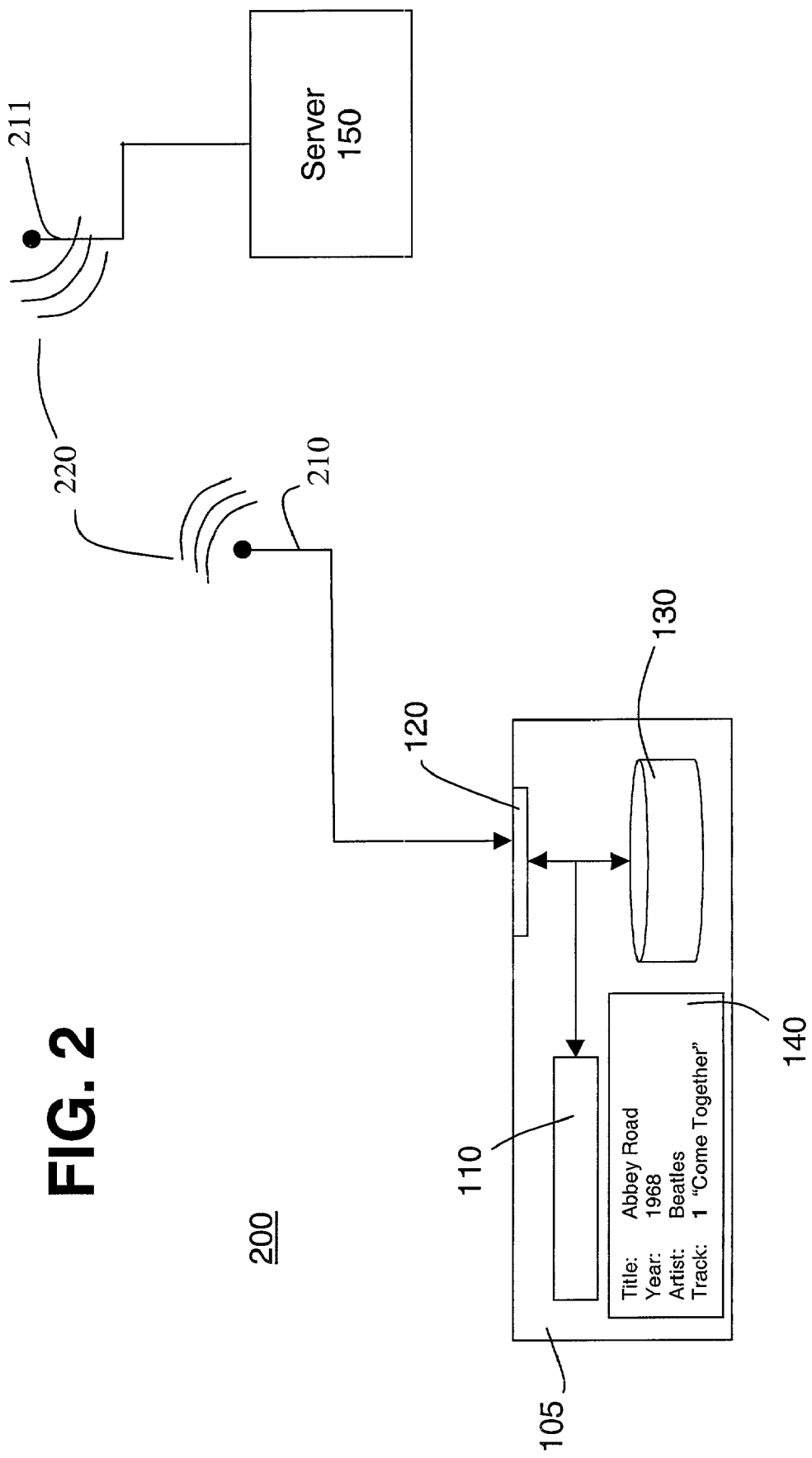

Another embodiment of a compact disc storage and playback system 200 is illustrated in FIG. 2. In this embodiment, the storage and playback apparatus 105 communicates to a server 150 via a wireless communication channel 220 using wireless transmitters/receivers 210, 211. Numerous different transmission protocols/media may be used, including satellite broadcast, paging systems, cellular phone systems and/or FM radio sideband. The same types of CD/DVD information may be transmitted between server 150 and the storage and playback apparatus 105 in this embodiment. One additional benefit of this embodiment, however, is that it may be employed as a mobile system 200 and used, for example, in automobiles or in hand-held playback devices.

Figure 4:
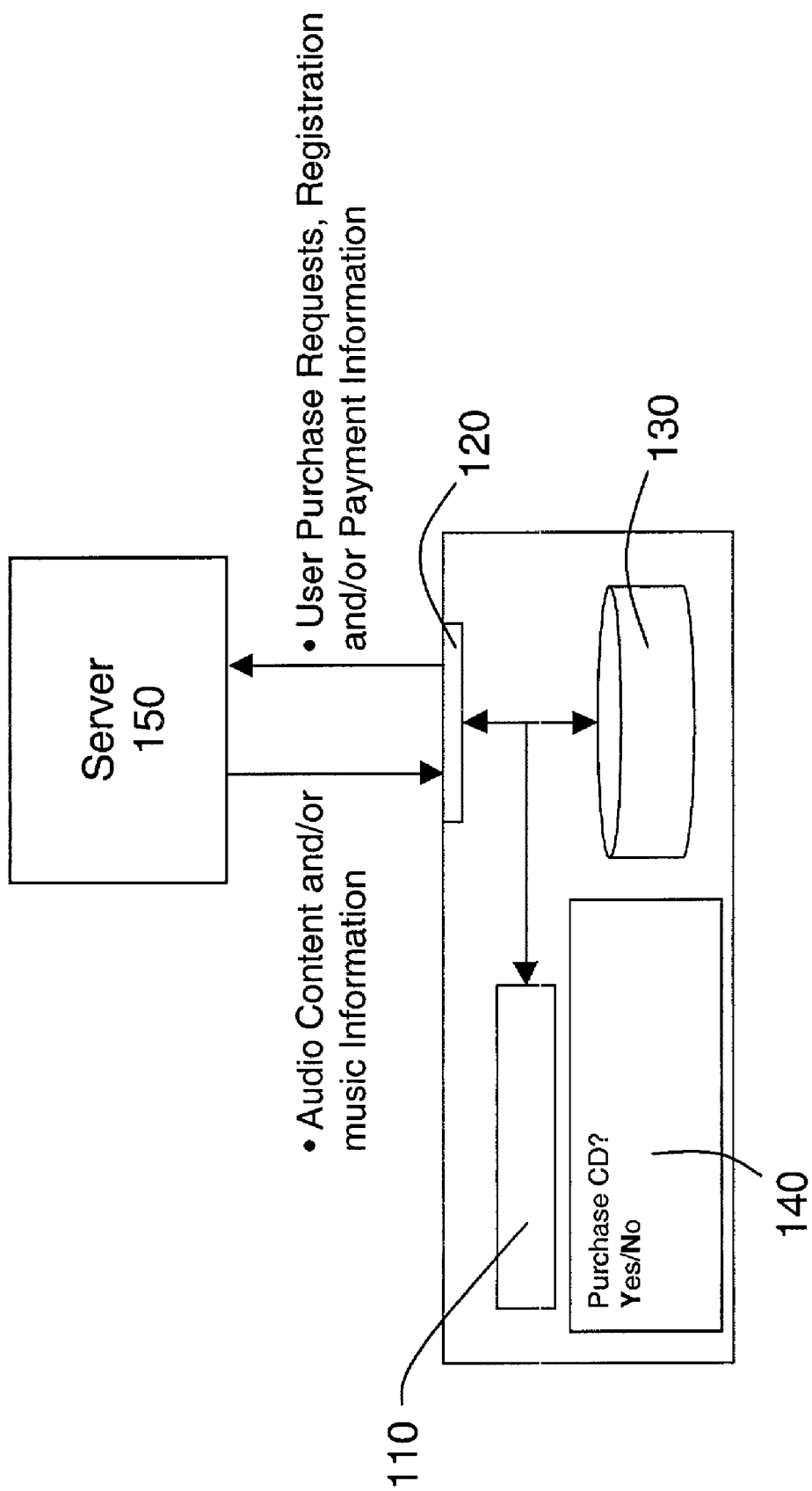

In addition to transmitting title/track data for CDs/DVDs copied to mass storage device 130, as illustrated in FIG. 4, the server 150 in one embodiment of the system will also transmit music/video content to the storage and playback apparatus 105 and will allow a user to purchase the transmitted audio/video content if he/she desires. If a user purchases the content, the user will be registered as an owner of the content on server 150, and will then be permitted to download the content as many times as needed. Accordingly, if the user owns a storage and playback apparatus 105 with a relatively small mass storage device 130 (e.g., a small, handheld device) then the user may selectively download only those CD/DVDs/tracks which the user currently wants stored on his device. Server 150 will keep track of the rest of the user's audio/video content to be downloaded at the user's request.

If a wireless system such as the one illustrated in FIG. 2 is implemented, then the same music content may be concurrently broadcast to a plurality of different storage and playback apparatuses 105. Those users who decide to purchase the transmitted audio/video content will automatically be registered on server 150 and the transmitted content will remain on those playback devices 105. If, however, a user decides not to purchase the music content, then the content will automatically be deleted from the user's playback device 105.

In one embodiment, although the same music content may be broadcast to a plurality of different users, only specific songs included within the broadcast will be played for individual users. The specific songs to be played may be selected based on the musical preferences of each user. Moreover, user preferences may be determined in a variety of ways including, for example, through a registration process (e.g., when the user opens an account on server 150) and/or based on the prior musical content purchased by the user.

In an embodiment of the system in which the storage and playback apparatus 105 is employed in an automobile, music or other audio/video content may continually be transmitted and stored on mass storage device 130, even when the automobile is not running. The specific type of audio/video content to be transmitted at a particular time during the day or week may be variable based on users' preferences. For example, server 150 may be configured to transmit up-to-date traffic reports during the morning and evening hours before the user leaves home/work. The user will then receive an instant traffic report as soon as he starts his car up in the morning and/or evening. Once the user listens to the traffic report, server 150 may one again begin transmitting digital musical content to the storage and playback apparatus 105.

In one embodiment of the system, the user may remove the mass storage device 130 from the storage and playback apparatus 105. The mass storage device 130 of this embodiment may be a portable flash memory module, mini-CD or a mini-hard drive which can be removed and inserted into another music player device (e.g., a pair of portable headphones or a portable MP3 player). In addition, in one embodiment the storage device 130 is hot-swappable so that a user does not need to power down the storage and playback apparatus 105 before removing it.

Embodiments of an Apparatus and Method for Transferring Multimedia Data

When a user purchases a CD/DVD storage and playback system 105 (or any other type of system capable of storing multimedia content), the user will subsequently need to copy his/her CD/DVD collection to the playback system's storage device 130. If the user has a standard CD/DVD drive, copying each CD/DVD may be quite time consuming, particularly if he/she has a large CD/DVD collection.

Figure 5:
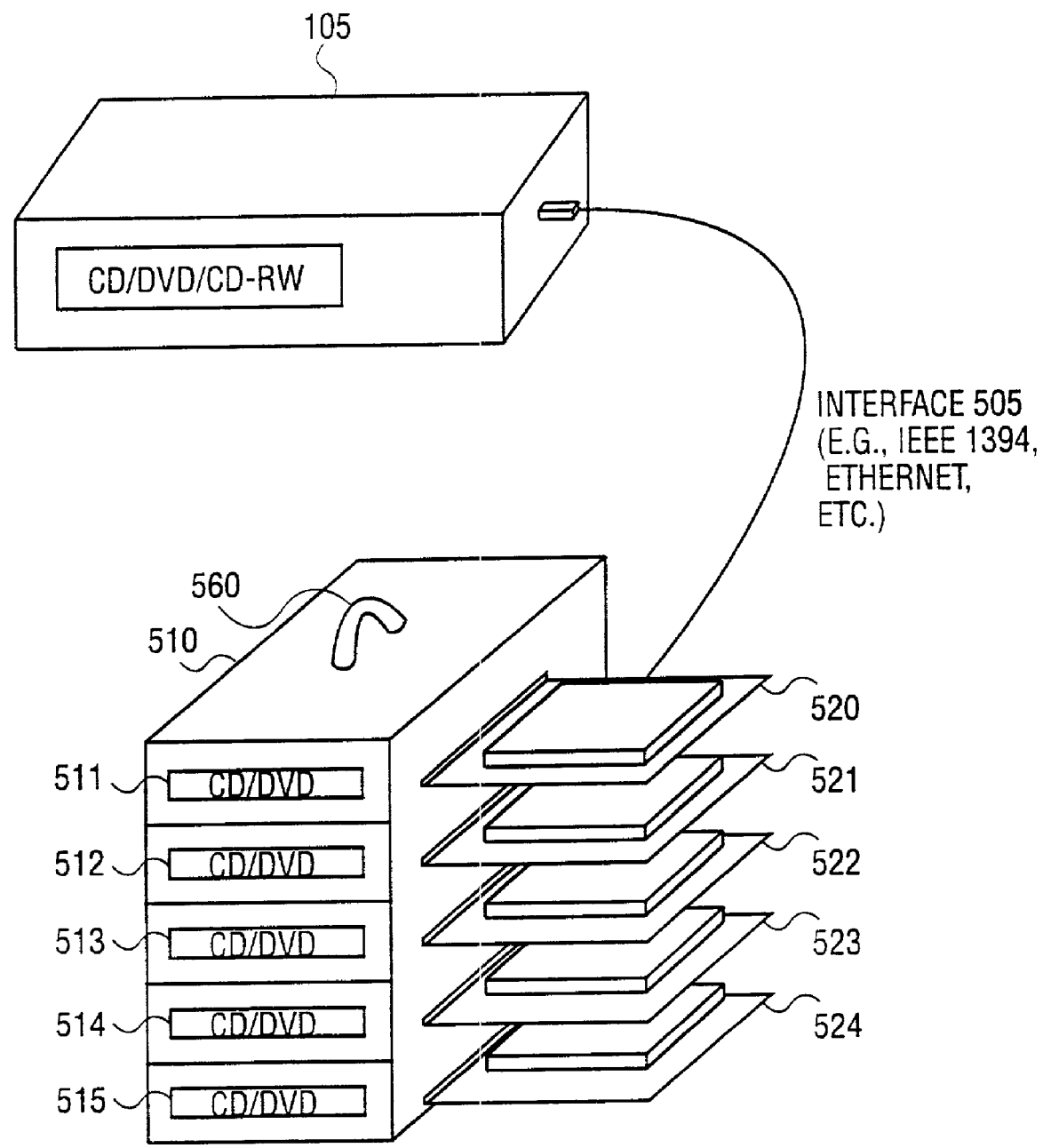

One embodiment of a CD/DVD transfer apparatus 510 for copying multimedia content from a collection of CDs/DVDs to a playback system 105 is illustrated in FIG. 5. The CD/DVD transfer apparatus 510 is comprised generally of a stack of CD/DVD drives 511-515 optimized to read multimedia content from a plurality of CDs/DVDs. As described in greater detail below, one embodiment of the transfer apparatus 510 also includes encoders for compressing the data read from each CD/DVD (e.g., using digital encoding algorithms such as MPEG-2, MP3, AC-3 . . . etc) and a high speed interface for copying the encoded content to the playback apparatus 105.

When transferring multimedia content from a large number of CDs/DVDs, it may become difficult for users, to keep track of the CD/DVD jewel cases which correspond to the CDs/DVDs inserted in the transfer apparatus 510. As illustrated in FIG. 5, one embodiment of the transfer apparatus 510 includes a plurality of shelves 520-524 for temporarily storing the jewel cases as CDs/DVDs are loaded into the apparatus 51 D. When a user inserts a new CD/DVD into a drive of the transfer apparatus 510, he/she may place the jewel case that corresponds to the CD/DVD on the shelf adjacent to the drive into which the CD/DVD was inserted. Accordingly, the illustrated shelf configuration provides a convenient, effective solution for tracking jewel cases for CDs/DVDs loaded into the transfer apparatus 510.

The shelves 520-524 may be repositioned within the transfer apparatus 510 when not in use. For example, in one embodiment, the sides of the shelves 520-524 are cooperatively mated with a set of guide rails or tracks (not shown) configured within the chassis of the loading apparatus 510. When the transfer apparatus 510 is not being used, the shelves 520-524 may be pushed along their respective guide rails/tracks into a locked position within the transfer apparatus 510. Various other retractable positions may be used to secure the shelves 520-524. For example, in one embodiment, the shelves 520-524 may be attached to the transfer apparatus 510 via a set of hinges and may fold into a locked position (e.g., parallel with the side of the transfer apparatus 510).

It should be understood that CD/DVD discs may be easily scratched and even damaged through careless handling. Further, the automated operation of CD/DVD stack 710/719 may present a pinching hazard to the content technician should a drive tray open in the immediate proximity of a currently open tray. For these reasons, one embodiment of the transfer apparatus 510 comprises controlling logic for the CD/DVD drive stack 710-719 to ensure that a disc is not ejected unless there is no danger to the content technician or media. For example, the controlling logic may prevent the transfer apparatus 510 from ejecting a disc or tray located above a disc or tray that is currently open.

A content transfer service may be offered to users who purchase the playback apparatus 105 (e.g., the service may be offered by the individual or organization selling the playback apparatus 105). More specifically, according to one embodiment, a content installation technician will arrive at the user's home with a transfer apparatus 510 and transfer all of the user's multimedia content to the playback apparatus 105 for the user. A handle 530 may be affixed to the top of the transfer apparatus 510 to aid in transporting the apparatus from one user location to the next. In addition, small wheels 599 may be extended from the rear corner of the unit to permit rolling the unit to the workplace via retractable handle 598 (somewhat like carry-on luggage.)

After multimedia content is transferred to the user's playback system 105 (or during the transfer process), any of the CD/DVD identification techniques described above may be used to identify CDs/DVDs copied to the system (e.g., via communication with a server 150 having a CD/DVD database). CD/DVD-related data (e.g., title, track information, CD/DVD indexing data . . . etc) may then be downloaded to the playback system 105 and used to index the multimedia content.

Figure 6:
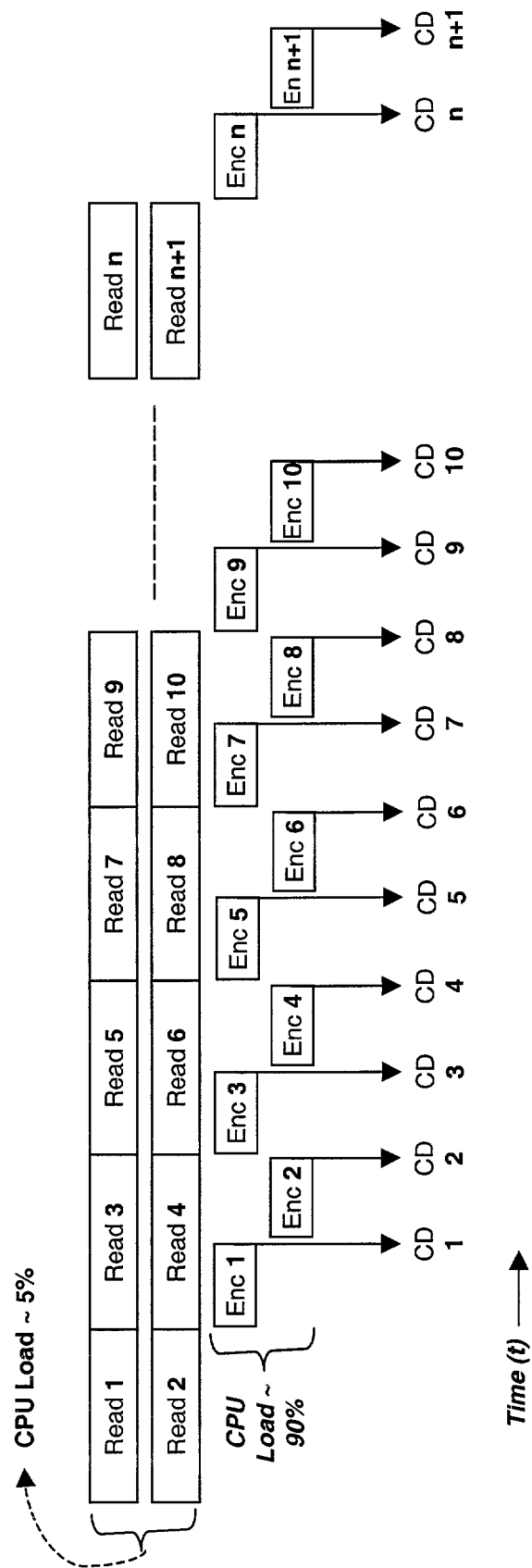

One embodiment of the transfer apparatus is configured to read and process several CDs/DVDs in parallel. The speed with which data may be read from a CD/DVD is highly dependent on the quality/speed of the drives and the I/O interface used to connect the drives to the transfer apparatus 510. I/O operations of this type are not typically CPU-intensive. By contrast, the speed with which the CD/DVD data is encoded is highly dependent on the processing power of the transfer apparatus 510 (e.g., the type/speed of the CPU and/or any encoder modules). With these factors in mind, one embodiment of the transfer apparatus 510 is configured to read from one set of CDs/DVDs at the same time as it encodes another set of CDs/DVDs (i.e., the set previously read). FIG. 6 graphically illustrates an embodiment in which two CDs/DVDs are read at the same time as another two CDs/DVDs are encoded. For example, while data is read from discs 3 and 4, the data previously read from discs 1 and 2 is encoded. The encoded data is then transmitted over the interface 505 to the playback system 105 where it is stored and indexed. Various numbers of read/encode operations may be performed concurrently (e.g., based on the processing power of the transfer apparatus and the speed of the CD/DVD interface).

Figure 7:
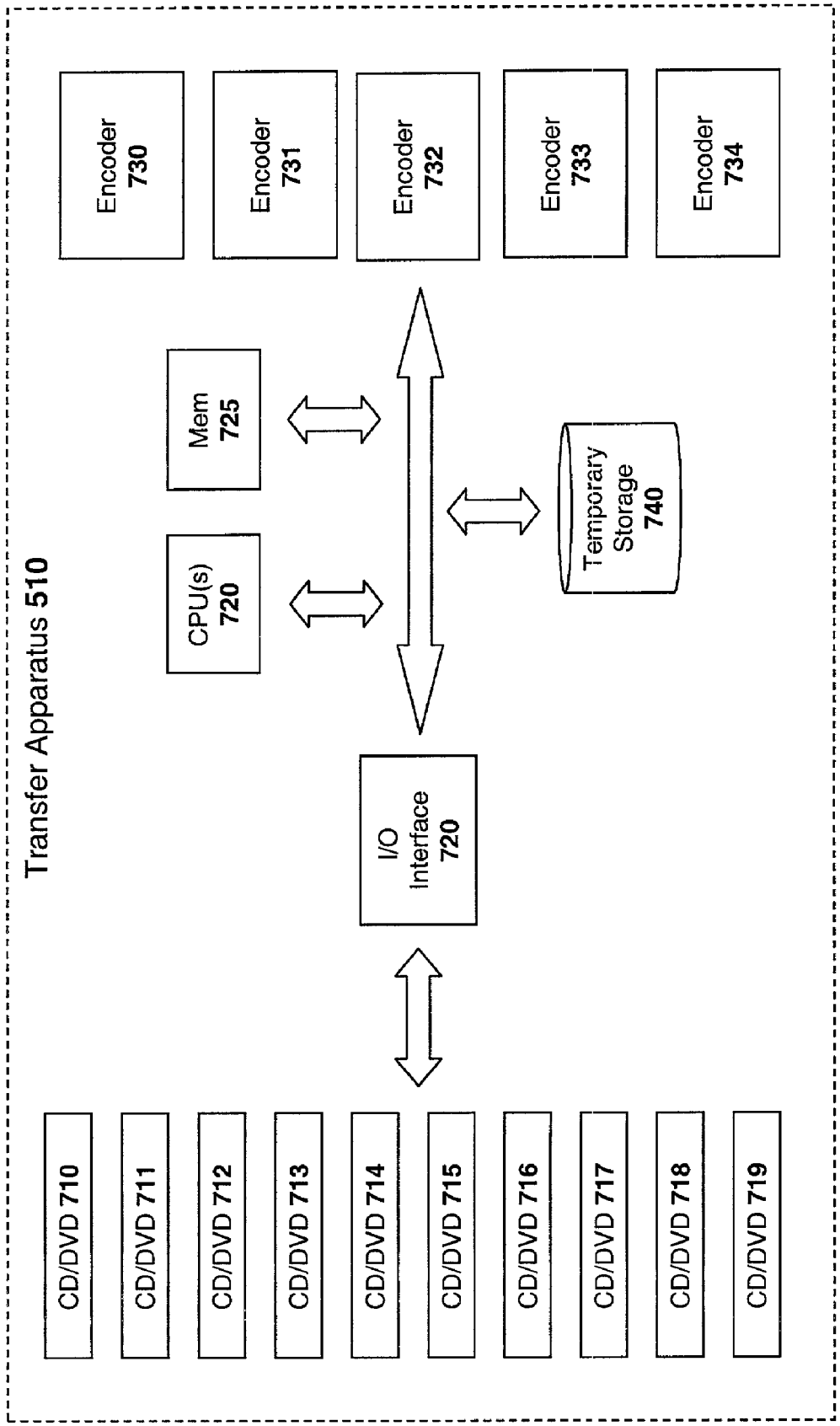

A hardware architecture of one embodiment of the transfer apparatus is illustrated in FIG. 7. This embodiment includes a plurality of CD or DVD drives 710-719 capable of performing read operations many times faster than standard audio CD drives (e.g., at 32× a standard CD drive). The CD/DVD drives 710-719 communicate over an I/O interface 720 which, in one embodiment, is a Small Computer System Interface ("SCSI"). However, various other interfaces (e.g., Ultra ATA, Enhanced IDE . . . etc) may be employed while still complying with the underlying principles of the invention.

The embodiment illustrated in FIG. 7 is further comprised of one or more central processing units ("CPUs") 720, a main memory 725 (e.g., random access memory ("RAM") or other dynamic storage medium) and/or a non-volatile storage medium 740 (e.g., a hard drive, flash memory, . . . etc). The CPU(s) of one embodiment are Athlon™ processors from Advanced Micro Devices ("AMD") running at clock speeds of 700 MHz or greater. However, various other processors may be employed in the system (e.g., Intel Pentium III® processors). In addition, one or more independent encoding processors 730-734 may be configured in the transfer apparatus 510 to efficiently encode multimedia content read from each of the CD/DVD drives (e.g., in MPEG3, MPEG-2, AC3 or other digital encoding format). It should be noted, however, that independent, hard-wired encoding modules are not required to comply with the underlying principles of the invention. For example, scheduling and encoding may be performed by software executed by the CPUs 620.

In one embodiment, a multitasking, multithreaded operating system such as Linux, or UNIX is executed on the transfer apparatus 510. A data transfer program executed in this embodiment may be used to schedule the various I/O and encoding operations described herein. More particularly, when executed on a system such as that illustrated in FIG. 7, the steps of reading data from each of the CDs/DVDs, encoding the data and transmitting the data to the playback system 105 may be performed in a highly parallel fashion (e.g., as illustrated in FIG. 6).

In one embodiment, the loading system 510 is electrically coupled to the playback apparatus 105 via a high speed serial interface such as an IEEE 1394 interface or an Ethernet interface. It should be noted, however, that various interfaces may be used to couple the playback apparatus with the loading apparatus 510 while still complying with the underlying principles of the invention (e.g., a wireless interface provided via IEEE 802.11b).

Figure 8:
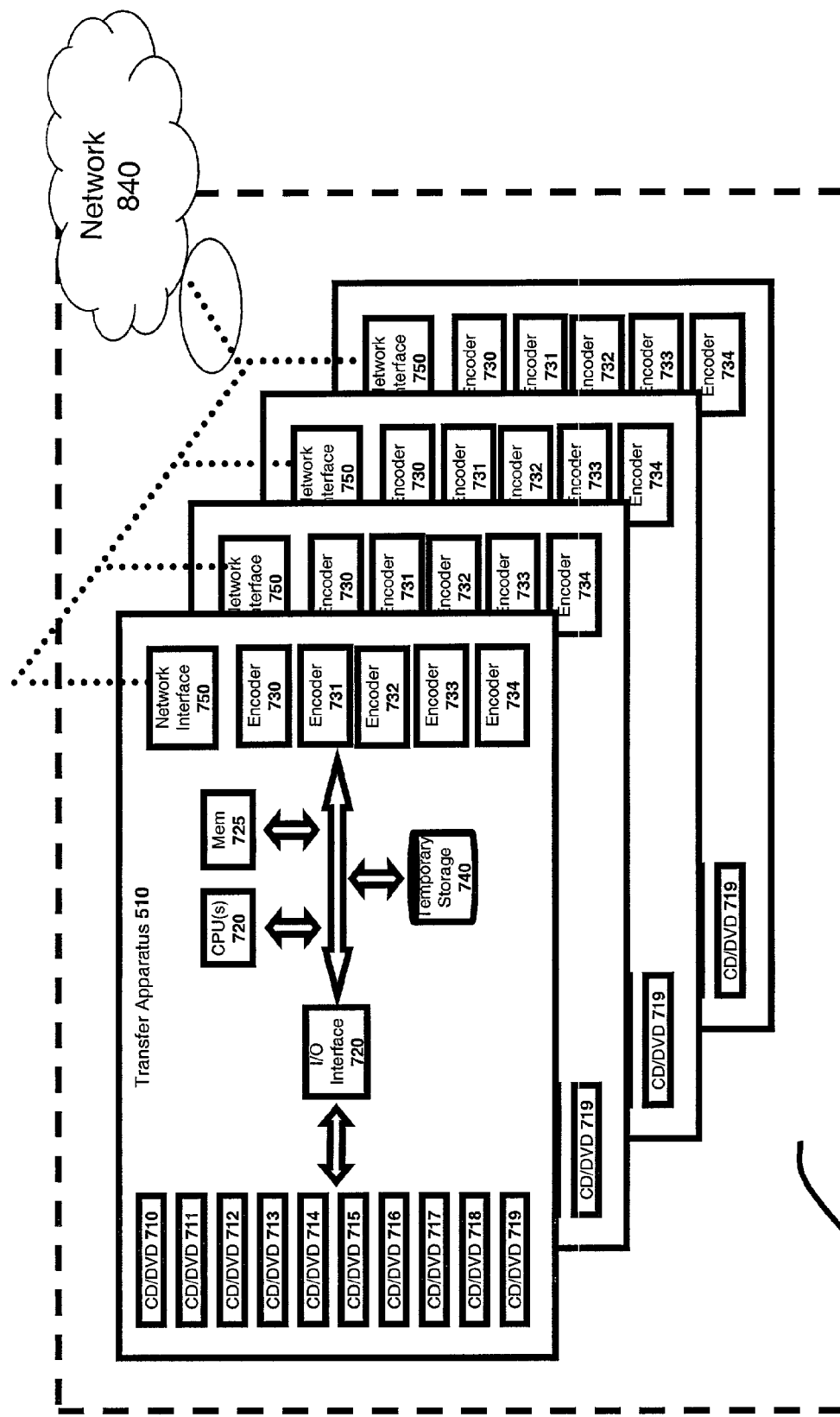

The embodiment illustrated in FIG. 8 comprises a plurality of transfer apparatus 510 interconnected by a high-speed local-area network 840 to form a processing ensemble or cluster 777. The several Loading Apparatus 510 combine under program control within each loading apparatus 510 to form a new homogenous loading apparatus 777 capable of correspondingly greater processing throughput in accordance with the number of loading apparatus 510 that comprise the processing cluster 777. In one embodiment, the formation of the processing cluster 777 is automatic; that is, it does not require any interaction with the content technician. Moreover, in one embodiment, one transfer apparatus 510 within cluster 777 is designated the master module, which supervises and coordinates interaction between the Server 150 and processing cluster 777 (e.g., the downloading of CD/DVD information as described above). Accordingly, in this embodiment, processing cluster 777 and transfer apparatus 510 present an identical interface as to Server 150 (e.g., via Network Interface 750).

Throughout the foregoing description, for the purposes of explanation, numerous specific details were set forth in order to provide a thorough understanding of the present system. It will be apparent, however, to one skilled in the art that the system and method may be practiced without some of these specific details. For example, although the transfer apparatus 510 is described above in the context of a particular type of CD/DVD playback system 105 (e.g., illustrated in FIGS. 1 through 4), the apparatus 510 may be used to load multimedia content on virtually any system having a storage device. Moreover, various aspects of the invention may be employed with media other than CDs or DVDs (e.g., MiniDiscs™, digital audio tapes ("DATs"), VHS tapes, . . . etc). Accordingly, the scope and spirit of the invention should be judged in terms of the claims which follow.

What is claimed is:

1. A method for providing a multimedia transfer service comprising:

transporting a multimedia transfer device to a user's home, the multimedia transfer device comprising,
  a housing;
  a plurality of media readers disposed adjacent one another within the housing;
  a central processing unit in electrical communication with the plurality of media readers and disposed within the housing;
  an encoder module in electrical communication with the central processing unit and disposed within the housing and configured to encode data read by said media readers in a specified encoding format; and
  a data communication interface in electrical communication with the central processing unit and disposed within the housing and configured to copy said encoded data to a media storage and playback apparatus, said user having a collection of multimedia content stored on physical media;

using said multimedia transfer device to transfer said multimedia content from said physical media to a mass storage device at said user's home; and monitoring the efficiency with which said multimedia content is transferred from said physical media to said mass storage device, wherein efficiency is determined by statistical analysis of performance parameters gathered during said transfer, and wherein said performance parameters include disc processing rate, transfer apparatus duty cycle, and a length of time one or more individual drives of said transfer apparatus are empty.

2. The method as in claim 1 further comprising:
indexing said multimedia content on said mass storage device on behalf of said user.

3. The method as in claim 2 wherein indexing comprises:
identifying said multimedia content with a code transmitted over a network link from said user's home to a multimedia content database; and
downloading information related to said multimedia content from said multimedia content database.

4. The method as in claim 3 wherein said code is a hashing code identifying said multimedia content using a fingerprint of said multimedia content.

5. The method as in claim 3 wherein said information related to said multimedia content includes a title of said multimedia content and/or track data for said multimedia content.

6. The method as in claim 3 wherein said information related to said multimedia content includes album cover information.

7. The method as in claim 3 wherein information related to said multimedia content includes song lyrics.

8. The method as in claim 3 wherein information related to said multimedia content includes information about artists who created said multimedia content.

9. The method as in claim 3 wherein information related to said multimedia content includes interactive content.

10. The method as in claim 1 wherein said physical media is a compact disk ("CD").

11. The method as in claim 1 wherein said physical media is a digital video disk ("DVD").

12. The method as in claim 3 wherein downloading said information occurs concurrently with transferring said multimedia content.

13. The method as in claim 3 wherein downloading said information occurs after transferring said multimedia content.

* * * * *